US008616509B2

(12) United States Patent
Declerck et al.

(10) Patent No.: US 8,616,509 B2
(45) Date of Patent: Dec. 31, 2013

(54) SUPPORT FOR DIRECT LIGHT DISPLAYS

(75) Inventors: Tom Declerck, Meulebeke (BE); Wesley Vercoutere, St.-Amandsberg (BE)

(73) Assignee: Barco N.V., Kortrijk (BE)

( * ) Notice: Subject to any disclaimer, the term of this patent is extended or adjusted under 35 U.S.C. 154(b) by 448 days.

(21) Appl. No.: 12/664,944

(22) PCT Filed: Jun. 18, 2008

(86) PCT No.: PCT/EP2008/057739

§ 371 (c)(1), (2), (4) Date: Dec. 16, 2009

(87) PCT Pub. No.: WO2008/155369

PCT Pub. Date: Dec. 24, 2008

(65) Prior Publication Data

US 2010/0181456 A1 Jul. 22, 2010

(30) Foreign Application Priority Data

Jun. 18, 2007 (GB) .................................. 0711626.2

(51) Int. Cl.
*A47B 91/00* (2006.01)
*F16M 11/20* (2006.01)

(52) U.S. Cl.
USPC ..................... 248/188.8; 248/188; 248/188.1; 248/188.2; 248/346.01; 248/346.03; 248/346.06; 40/606.01

(58) Field of Classification Search
USPC ........ 248/188, 188.1, 188.2, 188.8; 52/126.3, 52/136.4, 71; 40/606.01; 220/629, 628, 220/23.4
See application file for complete search history.

(56) References Cited

U.S. PATENT DOCUMENTS

| | | | | | |
|---|---|---|---|---|---|
| 3,655,159 | A | * | 4/1972 | Held, Jr. | 248/188.1 |
| 3,674,230 | A | * | 7/1972 | Propst | 248/188.8 |
| 3,952,983 | A | * | 4/1976 | Crochet | 248/173 |
| 3,986,316 | A | * | 10/1976 | Blodee | 403/218 |
| 4,060,294 | A | * | 11/1977 | Haworth et al. | 439/215 |
| 4,126,288 | A | * | 11/1978 | De Sisto et al. | 248/188.1 |
| 4,163,537 | A | * | 8/1979 | Mourgue | 248/188.1 |
| 4,193,233 | A | * | 3/1980 | VandenHoek et al. | 52/126.4 |
| 4,416,093 | A | * | 11/1983 | Salkeld et al. | 52/71 |
| 5,174,532 | A | * | 12/1992 | Huang | 248/188.1 |
| 5,181,686 | A | * | 1/1993 | Barthel | 248/346.07 |
| 5,231,713 | A | * | 8/1993 | McDonnell | 5/310 |

(Continued)

FOREIGN PATENT DOCUMENTS

| | | | |
|---|---|---|---|
| CN | 1739134 | A | 2/2006 |
| DE | 199 23 798 | A1 | 11/2000 |
| EP | 0 156 476 | | 10/1985 |
| WO | 2005/036507 | A2 | 4/2005 |

OTHER PUBLICATIONS

Office Action from State Intellectual Property Office of the People's Republic of China (SIPO) for Chinese Patent Application 200880020545.1, dated Aug. 2, 2012 (7 pages).

(Continued)

*Primary Examiner* — Terrell McKinnon
*Assistant Examiner* — Michael McDuffie
(74) *Attorney, Agent, or Firm* — Bacon & Thomas, PLLC

(57) ABSTRACT

The present invention relates to supports for stacking multiple display elements. The supports are connected in a firm way to one another by a hinge which can, if required, be easily disconnected.

10 Claims, 3 Drawing Sheets

(56) References Cited

U.S. PATENT DOCUMENTS

| | | | | | |
|---|---|---|---|---|---|
| 5,302,039 | A * | 4/1994 | Omholt | 403/218 |
| 5,511,758 | A * | 4/1996 | Hsu | 248/461 |
| 5,904,005 | A * | 5/1999 | Dyer et al. | 52/71 |
| 6,079,687 | A * | 6/2000 | Calleia | 248/346.01 |
| 6,226,931 | B1 * | 5/2001 | Haversat | 52/71 |
| 6,419,198 | B1 * | 7/2002 | Einav | 248/346.07 |
| 6,450,469 | B1 * | 9/2002 | Okuno | 248/346.01 |
| 6,631,751 | B2 * | 10/2003 | Coles et al. | 160/351 |
| 6,981,680 | B1 * | 1/2006 | Gordon et al. | 248/346.01 |
| 7,234,275 | B1 * | 6/2007 | Haggy et al. | 52/71 |
| 7,310,917 | B2 * | 12/2007 | Valdez | 52/127.8 |
| 2002/0179788 | A1 * | 12/2002 | Crookham et al. | 248/188 |
| 2003/0046893 | A1 * | 3/2003 | Fritsche et al. | 52/690 |
| 2004/0100796 | A1 | 5/2004 | Ward | |
| 2005/0167553 | A1 * | 8/2005 | Mettler et al. | 248/188 |
| 2007/0068055 | A1 | 3/2007 | Segan et al. | |

OTHER PUBLICATIONS

Chinese Office Action in corresponding Application 200880020545.1, dated Apr. 23, 2013, English translation thereof.

* cited by examiner

SUPPORT FOR DIRECT LIGHT DISPLAYS

TECHNICAL FIELD OF THE INVENTION

The present invention relates to supports, i.e. bases or feet for multiple display elements, e.g. supports, i.e. bases or feet for multiple stacked display elements, and methods of making the same.

BACKGROUND OF THE INVENTION

LED walls can be mounted in several ways. Trussing (hanging the display down from a truss beam), mounting (fixing the structures or display tiles on a mounting structure which is itself mounted to e.g. a wall), or stacking (piling the tiles on a foot or several linked feet).

A modern LED wall often consists of display elements (tiles) which represent a part of the total display. A multitude of tiles are mechanically locked together, yielding a display. One of the important specifications of a LED wall is the seamlessness of the total display. For optimal viewing experience, the seams in between tiles must not be visible. These seams are caused by several reasons, e.g. tolerances between locks of the tiles, tolerances on the LED boards, deformations of the LED frames and structures. One other major reason is the flatness of the stacking foot or support.

When a display is stacked, it is mounted on a number of stacking feet or supports. These feet or supports are mechanical structures, which are the interface between the ground surface on which the display is going to be mounted, and the display itself. In general, several feet or supports are needed to accommodate the width of the display. If the alignment of the feet or supports on which the tiles are mounted, is not sufficient, seams may become visible for the viewer leading to a decreased viewing result.

DESCRIPTION OF THE INVENTION

It is an object of the present invention to provide good systems and methods for stacking and/or good methods and systems for aligning or configuring a tiled display wall and a display wall thus obtained. It is an advantage of embodiments according to the present invention that a method for stacking multiple display elements, i.e. display tiles, by using a new design of display feet or supports, e.g. stacking feet.

The above object is obtained by systems, devices and methods as set out in the independent claims. Particular embodiments are as set out below and/or as provided by the dependent claim.

The present invention provides a support system for supporting multiple planar display elements, the support system comprising at least a first base and a second base, wherein the first base and the second base are adapted for movable connecting to each other, the first and second bases being joinable by a hinge mechanism, the hinge axis about which the second base may rotate with respect to the first base being perpendicular to the plane of a planar display element when the display element is supported by the first or second base.

The present invention also provides a method for aligning a display system comprising a support system comprising a plurality of bases, the method comprising:

providing a hinging movement, of a moveable connection between at least two bases of the support system, locating at least two display elements in the at least two bases, and aligning the at least two display elements of the display system.

It is an advantage of embodiments according to the present invention that, instead of using separated stacking feet or supports with four adjustment points at each corner as often done in prior art, the feet or supports can be connected in a very firm way to one another by a connection, e.g. hinge, which can be easily disconnected when required. It is an advantage of an embodiment of the present invention that e.g. two connected feet or supports may pivot in the middle of their total length. It is an advantage of some embodiments of the present invention that each foot or support can be adjusted at its ends. Per foot or support there may be a provision to adjust the height of the hinge. In this way, the alignment process of connected stacking feet or supports can be improved.

The characteristics, features and advantages of the present invention will become apparent from the following detailed description, taken in conjunction with the accompanying drawings, which illustrate, by way of example only, the principles of the invention. This description is given for the sake of example only, without limiting the scope of the invention. The reference figures quoted below refer to the attached drawings.

Figure 1:
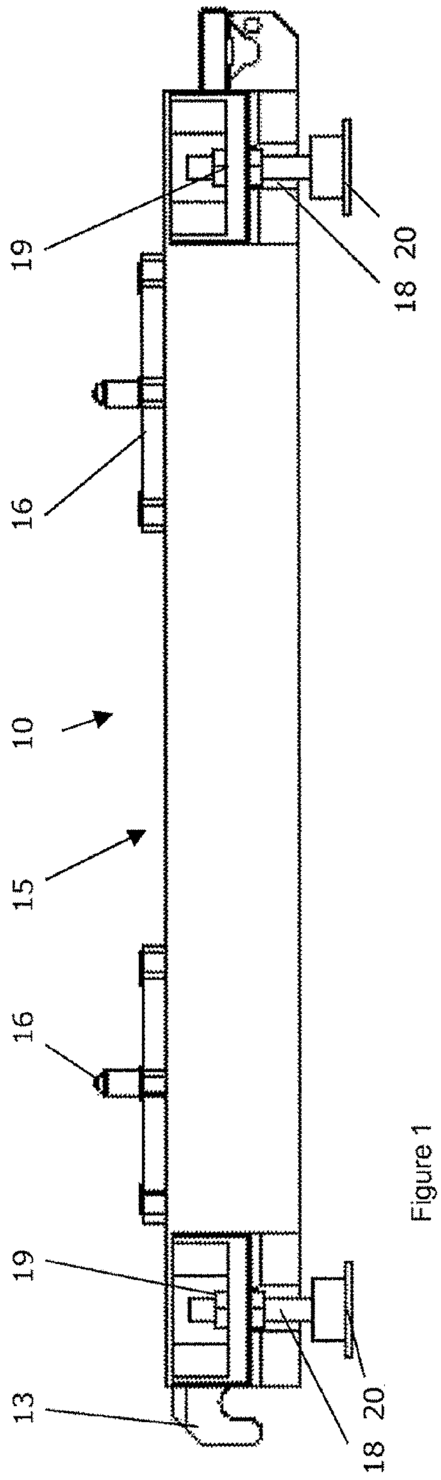
FIG. 1 illustrates an example support, i.e. base or foot for stacking multiple display elements according to an embodiment of the present invention.

In the different figures, the same reference signs refer to the same or analogous elements.

DESCRIPTION OF THE ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second, third and the like in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In the present invention, with moveable connection there is meant a connection between two parts such that the two parts cannot be moved completely independently of each other, i.e. the two parts are connected to each other, but whereby a relative position of the first component can be altered with respect to the second component. Examples thereof are different types of hinges, etc. The connection connected by the moveable connection may be such that the different components can be for example rotated or pivoted with respect to each other.

In a first aspect, the present invention relates to a support system for supporting multiple display elements, such as e.g. display tiles in a display wall. The support system thereby comprises at least a first support, i.e. base or foot or support element and a second support, i.e. base or foot or support element, whereby the first support, i.e. base or foot and the second support, i.e. base or foot are adapted for moveable connecting to each other. With moveable connecting there is meant that the two supports, i.e. bases or feet are fixed to each other, but that a relative orientation of the supports, i.e. bases or feet can be altered, e.g. that the different supports, i.e. bases or feet can be pivoted or rotated with respect to each other.

In embodiments of the present invention a support system for supporting multiple planar display elements is provided, the support system comprising at least a first base and a second base. The first base and the second base are adapted for movable connecting to each other, the first and second bases being joinable by a hinge mechanism. The hinge axis about which the second base may rotate with respect to the first base is perpendicular to the plane of a planar display element when the display element is supported by the first or second base.

Figure 2:
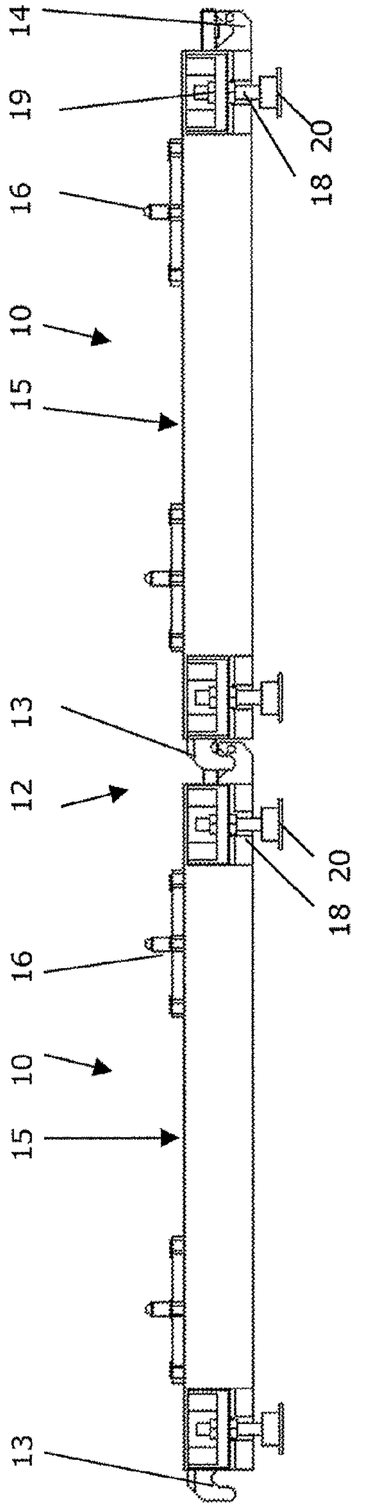
FIG. 2 illustrates an example of two stacking supports, i.e. bases or feet connected by a hinge, according to one embodiment of the present invention.
Figure 3:
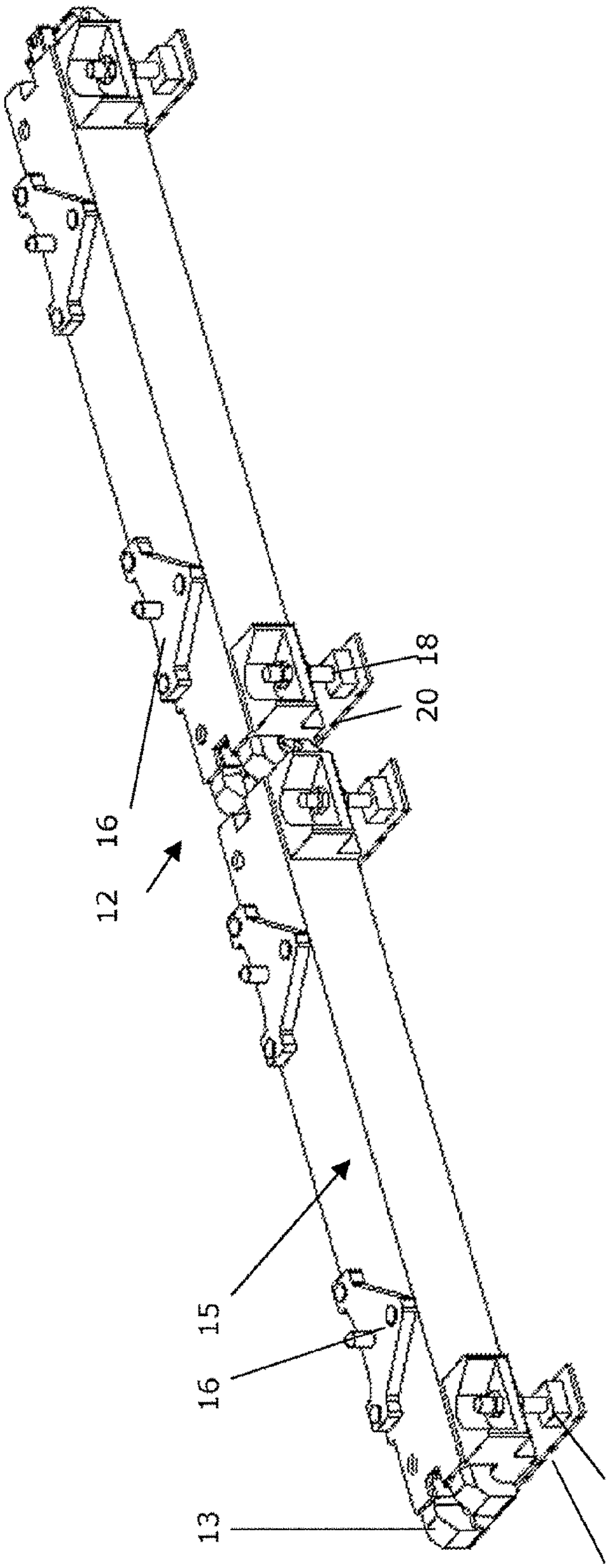
FIG. 3 illustrates an isometric top view of an example of two supports connected by a hinge, according to an embodiment of the present invention.
Figure 4:
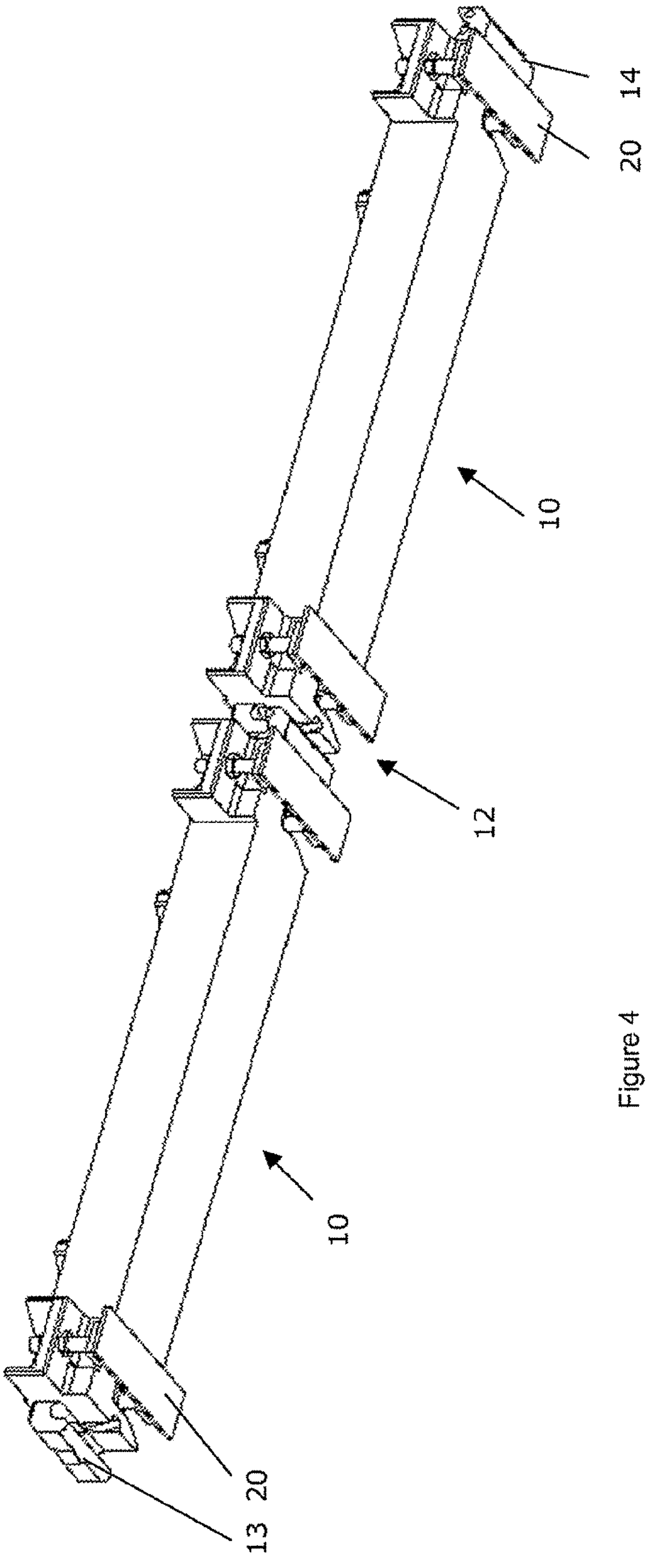
FIG. 4 illustrates an isometric bottom view of an example of two stacking supports, i.e. bases or feet connected by a hinge, according to an embodiment of the present invention.

By way of illustration, the invention not limited thereto, an exemplary support system is shown in FIG. 2 in side view, in FIG. 3 and FIG. 4 in elevated top and bottom view. FIG. 1 illustrates a single support element 10 which may be part of the support system. FIG. 2 shows two support elements 10 connected together. The first support element 10 and the second support element 10 may be adapted for being connected through a hinging connection 12 for obtaining the moveable connecting. The hinging connection 12 may be a hinge. The moveable connection may for example comprise two parts 13, 14, the two parts co-operating to work as a connection 12. The first part 13 may be present on a first support element 10 and the second part 14 may be present at the second support element 10 such that the first support element 10 and the second support element 10 can be connected to each other. In an advantageous embodiment, each support element 10 may at one side or end be provided with the first part 13 of the moveable connection and at the opposite side or other end be provided with the second part 14 of the moveable connection 12, such that each support element 10 can be connected to a neighbouring support element 10. The first part 13 and the second part 14 of the moveable connection 12 may be adapted to cooperate so as to form the connection. The connection thereby is such that the two support elements are still moveable with respect to each other, e.g. rotatable or pivotable. A hinging movement may e.g. be still possible while the support elements 10 are connected to each other. The number of support elements 10 of the support system advantageously comprises at least two elements 10 but is not limited in number. Each support element 10 may carry at least one but also more display elements or tiles.

When more display tiles are supported by each support element 10, the display elements or tiles advantageously are stacked onto each other. The display element will typically be a planar display and the plane of the display is preferably perpendicular to the hinge axis of the connection 12. The planar display will typically be located vertically on top of a support element 10 which acts as a base or foot for the display. The support element is rigid, e.g. a U-shape or box section to take the weight of the display elements. Hence, the support element also may carry more than one display element or display tile next to each other instead of or in combination to display tiles in a stacked way. The support element 10 may comprise a base surface 15 with mounting members 16 for mounting the display elements or display tiles on the base surface 15. The support element 10 furthermore may comprise control means 18 for controlling the relative position of the support 10 with respect to a surface on which the support element 10 is positioned or stands. The control means 18 may be extendable legs at one or more sides of the support element 10 for controlling the position, e.g. height of the support element 10 with respect to the surface on which the support, i.e. base or foot is positioned. The support element 10 also may comprise adjusting means 19 to adjust the position and or height of the moveable connection, e.g. a screw thread and a nut. The control elements may have a flat base 20 smaller in size that the extent of the support 10.

FIGS. 3 and 4 show two support elements 10 connected together by means of connection 12. The first part 13 of the connection 12 comprises one or more claws that locate over matching receiving parts 14 on the neighbouring support element 10 which may also be adapted to be inverted claws so that the two sets of claws when placed together allow alignment.

It is an advantage of embodiments of the present invention that the moveable connection 12 allows alignment of the connected supports, i.e. bases or feet 10 and thus of the display elements of the display wall, resulting in an efficient alignment and allowing to obtain a substantially seamless display view. By providing a moveable connection 12 between the support elements 10, the alignment of the corresponding display wall can be performed in a more efficient way as the support elements 10 cannot be positioned and aligned completely independent of each other but adjustment of one support element 10 influences the positioning or alignment of the neighbouring support element 10.

In a second aspect, the present invention relates to a display system comprising a support system as described in the first aspect. The display system may be a display wall built up from a number of display elements or display tiles. The display wall may consist of N x M display tiles. The features and advantages of the support system as described in the first aspect may be present in the display system.

In a third aspect, the present invention relates to a support 10, i.e. base or foot for use in a support system as set out in the first aspect. The features and advantages of support elements as described in the first aspect may be obtained in the current aspect. As set out, the support, i.e. base or foot may comprise at least at one side a first part 13 of a moveable connection 12 for forming a moveable connection 12 with a second part 14 of another support, i.e. base or foot 10 in the support system. Such a support, i.e. base or foot 10 may comprise a first part 13 of a moveable connection at one side of the support, i.e. base or foot and comprises a second part 14 of a moveable connection at another side of the support, i.e. base or foot, the first part and second part being shaped such that they would result in the moveable connection if they were combined with each other, e.g. when placed together or inserted in each other.

In a fourth aspect, the present invention also relates to a method for aligning a display system comprising a support system comprising a plurality of supports, i.e. bases or feet, wherein the method comprises providing a movement, e.g. hinging movement, of a moveable connection between at least two supports, i.e. bases or feet of a support system for aligning at least two display elements of the display system. Such a method may comprise adjusting the position of the moveable connection and/or adjusting the control means for controlling the relative position of the support system with respect to the surface whereon the support system is positioned. Further steps, features and advantages may be as derivable or stemming from the features of the device or system as set out in the first, second or third aspect.

It is an advantage of embodiments according to the present invention that the different supports, i.e. bases or feet can be connected such that the different supports, i.e. bases or feet do not act fully independent of each other, resulting in a more efficient alignment system. It is an advantage of embodiments according to the present invention that the feet or supports can be connected in a firm way to one another, while, when required, the connection can be easily disconnected.

The invention claimed is:

1. A support system for supporting multiple planar displays comprising:

at least a first stacking foot and a second stacking foot, each of said at least first stacking foot and second stacking foot comprising a base support configured to vertically support at least one planar display;

a movable connection connecting the first stacking foot and the second stacking foot with each other, the movable connection comprising a hinge mechanism configured to join the first and second stacking foot to each other, wherein said hinge mechanism comprises a first part coupled to the first stacking foot and a second part coupled to the second stacking foot, said first part comprising at least one first claw and said second part comprising at least one receiving part for the at least one first claw, wherein the hinge mechanism has an axis which extends perpendicular to the plane of a planar display when the planar display is supported by the first or second stacking foot, and wherein said movable connection is configured in a way such that said at least one first claw is arranged to align the first stacking foot with the second stacking foot when the first claw and the receiving part are connected together.

2. The support system according to claim 1, wherein said support system comprises stacked multiple planar displays for forming a display wall.

3. The support system according to claim 1, wherein the at least first stacking foot and second stacking foot are provided with adjusting means to adjust the position of the movable connection.

4. The support system according to claim 1, wherein the at least first stacking foot and second stacking foot are provided with control means for controlling the relative position of the first or second stacking foot with respect to a surface on which the first or second stacking foot is positioned.

5. A display system comprising a support system as described in claim 1.

6. The display system according to claim 5, the display system comprising a display wall.

7. The stacking foot according to claim 1, wherein said at least one first claw and at least one receiving part are configured to be movably connected upon being connected to each other.

8. A method for aligning a display system comprising a support system according to claim 1, the method comprising: providing a hinging movement, of a moveable connection between at least two stacking feet of the support system, locating at least two planar displays in the at least two stacking feet, and aligning the at least two planar displays of the display system.

9. The stacking foot according to claim 1, wherein the receiving part of the hinge mechanism comprises at least one inverted claw configured to connect with the at least one first claw.

10. A stacking foot used in a support system for supporting multiple planar displays having at least a first stacking foot and a second stacking foot and a movable connection connecting the first stacking foot and the second stacking foot with each other, said stacking foot comprising:

a first side and a second side, wherein the at least first side comprises a first part configured to form a moveable connection with a second part of another stacking foot in the support system, wherein said first part comprises at least one first claw configured in a way such that said at least one first claw is arranged to align the stacking foot with the another stacking foot when the first claw of the stacking foot is connected with a receiving part of the second part of the another stacking foot.

* * * * *